United States Patent
Cohen et al.

(10) Patent No.: US 7,593,320 B1
(45) Date of Patent: Sep. 22, 2009

(54) FAILOVER SCHEME FOR STACKABLE NETWORK SWITCHES

(75) Inventors: Yuval Cohen, Raanana (IL); Tal Anker, Modiin (IL)

(73) Assignee: Marvell International, Ltd., Hamilton (BM)

( * ) Notice: Subject to any disclaimer, the term of this patent is extended or adjusted under 35 U.S.C. 154(b) by 972 days.

(21) Appl. No.: 10/836,661

(22) Filed: Apr. 30, 2004

(51) Int. Cl.
*H04L 12/26* (2006.01)
(52) U.S. Cl. ....................................... 370/217
(58) Field of Classification Search ................. None
See application file for complete search history.

(56) References Cited

U.S. PATENT DOCUMENTS

| | | | | |
|---|---|---|---|---|
| 6,681,258 | B1 * | 1/2004 | Ratcliff et al. | 709/245 |
| 6,931,568 | B2 * | 8/2005 | Abbondanzio et al. | 714/11 |
| 6,934,292 | B1 * | 8/2005 | Ammitzboell | 370/400 |
| 7,143,168 | B1 * | 11/2006 | DiBiasio et al. | 709/226 |
| 7,184,441 | B1 * | 2/2007 | Kadambi et al. | 370/400 |
| 7,260,060 | B1 * | 8/2007 | Abaye et al. | 370/230 |
| 7,274,703 | B2 * | 9/2007 | Weyman et al. | 370/401 |
| 2002/0194369 | A1 * | 12/2002 | Rawlins et al. | 709/238 |
| 2004/0165525 | A1 * | 8/2004 | Burak | 370/228 |
| 2005/0105560 | A1 * | 5/2005 | Mann et al. | 370/503 |
| 2005/0198373 | A1 * | 9/2005 | Saunderson et al. | 709/238 |
| 2006/0251085 | A1 * | 11/2006 | Kalkunte et al. | 370/400 |
| 2007/0086360 | A1 * | 4/2007 | Berg | 370/254 |

* cited by examiner

*Primary Examiner*—Kevin C Harper
*Assistant Examiner*—Rhonda Murphy

(57) ABSTRACT

A method, apparatus, and computer-readable media for a stackable multi-layer switch comprises a first set of stack units comprising a master stack unit, wherein one of the stack units in the first set comprises a first port to communicate with a network using a first Internet Protocol address; and a second set of the stack units comprising a backup master stack unit, wherein one of the stack units in the second set comprises a second port to communicate with the network using the first Internet Protocol address; wherein each of the stack units comprises a control plane processor, one or more ports, a stacking interface, and a forwarding engine to communicate with the control plane processor, the ports, and the stacking interface; wherein the stack units communicate with each other through the stacking interfaces; and wherein, when the master stack unit is unable to communicate with the backup master stack unit through the stacking interfaces, the first and second ports attempt to communicate with each other over the network using a second Internet Protocol address associated with the first port and a third Internet Protocol address associated with the second port.

70 Claims, 6 Drawing Sheets

FAILOVER SCHEME FOR STACKABLE NETWORK SWITCHES

BACKGROUND

The present invention relates generally to data communications. More particularly, the present invention relates to a failover scheme for stackable network switches.

A stackable switch comprises a plurality of stack units. Like regular network switches, each stack unit comprises ports, a forwarding engine, and a control plane processor (CPP). But each stack unit also includes one or more stacking interfaces for interconnecting a plurality of the stack units via stacking links to form a stackable switch, in which one of the stack units is configured as the master stack unit. A stackable switch performs as a single large switch, with the control plane processor of the master stack unit acting as the control plane processor for the entire stackable switch.

In a stackable switch, a network interface can include ports on two or more of the stack units, for example by configuring the ports as a virtual local area network (VLAN). By definition, every network interface is assigned an Internet Protocol (IP) address. This configuration works well until the master stack unit can no longer communicate over the stacking links with one or more of the other stack units in the stackable switch, for example because one or more of the stack units, stacking interfaces, or stacking links has failed. When this happens, one or more of the stack units can communicate independently with the network using the same IP address, a network condition that is not permitted.

SUMMARY

In general, in one aspect, the invention features a method, apparatus, and computer-readable media for a stackable multi-layer switch comprising a first set of stack units comprising a master stack unit, wherein one of the stack units in the first set comprises a first port to communicate with a network using a first Internet Protocol address; and a second set of the stack units comprising a backup master stack unit, wherein one of the stack units in the second set comprises a second port to communicate with the network using the first Internet Protocol address; wherein each of the stack units comprises a control plane processor, one or more ports, a stacking interface, and a forwarding engine to communicate with the control plane processor, the ports, and the stacking interface; wherein the stack units communicate with each other through the stacking interfaces; and wherein, when the master stack unit is unable to communicate with the backup master stack unit through the stacking interfaces, the first and second ports attempt to communicate with each other over the network using a second Internet Protocol address associated with the first port and a third Internet Protocol address associated with the second port.

Particular implementations can include one or more of the following features. To attempt to communicate, the first port transmits a packet to the network, wherein the source address of the packet is the second Internet Protocol address and destination address of the packet is the third Internet Protocol address. To attempt to communicate, the second port transmits a packet to the network, wherein the source address of the packet is the third Internet Protocol address and destination address of the packet is the second Internet Protocol address. When the first and second ports are able to communicate using the respective second and third Internet Protocol addresses, at least one of the master stack unit and the backup master stack unit selects one of the first and second sets of stack units according to predetermined criteria; wherein the one of the first and second ports in the selected set of stack units continues to communicate with the network using the first Internet Protocol address; and wherein the one of the first and second ports in the set of stack units not selected ceases to communicate with the network. The predetermined criteria comprises at least one of the group consisting of the number of stack units in the first set of stack units; the number of stack units in the second set of stack units; the relative uptimes of the master stack unit and the backup master stack unit; the number of ports in the first set that communicate with the network using the first Internet Protocol address; and the number of ports in the second set that communicate with the network using the first Internet Protocol address. When the first and second ports are able to communicate using the respective second and third Internet Protocol addresses, the forwarding engines in the stack units comprising the first and second ports exchange packets of data over the network using the second and third Internet Protocol addresses. The first port encapsulates one of the packets of data in a second packet and transmits the second packet to the network, wherein the source address of the second packet is the second Internet Protocol address and the destination address of the second packet is the third Internet Protocol address. The second port encapsulates one of the packets of data in a second packet and transmits the second packet to the network, wherein the source address of the second packet is the third Internet Protocol address and the destination address of the second packet is the second Internet Protocol address. The network comprises a plurality of interconnected networks. An Ethernet switch comprises the stackable multi-layer switch.

In general, in one aspect, the invention features a method, apparatus, and computer-readable media for a first stack unit for a stackable multi-layer switch comprising a first set of the stack units including the first stack unit, wherein one of the stack units in the first set comprises a first port to communicate with a network using a first Internet Protocol address, and a second set of the stack units including a second stack unit, wherein one of the stack units in the second set comprises a second port to communicate with the network using the first Internet Protocol address, the first stack unit comprising a control plane processor; one or more ports; a stacking interface; and a forwarding engine to exchange packets of data with the control plane processor, the master ports, and the stacking interface; wherein the stack units communicate with each other through the stacking interfaces; and wherein, when the first stack unit is unable to communicate with the second stack unit through the stacking interfaces, the first stack unit causes the first port to attempt to communicate with the second port over the network using a second Internet Protocol address associated with the first port and a third Internet Protocol address associated with the second port.

Particular implementations can include one or more of the following features. To attempt to communicate, the first port transmits a packet to the network, wherein the source address of the packet is the second Internet Protocol address and destination address of the packet is the third Internet Protocol address. When the first and second ports are able to communicate using the respective second and third Internet Protocol addresses, at least one of the first and second stack units selects one of the first and second sets of stack units according to predetermined criteria; wherein the one of the first and second ports in the selected set of stack units continues to communicate with the network using the first Internet Protocol address; and wherein the one of the first and second ports in the set of stack units not selected ceases to communicate with the network. The predetermined criteria comprises at least one of the group consisting of the number of stack units in the first set of stack units; the number of stack units in the second set of stack units; the relative uptimes of the first and second stack units; the number of ports in the first set that communicate with the network using the first Internet Protocol address; and the number of ports in the second set that communicate with the network using the first Internet Protocol address. Each of the stack units comprises a forwarding engine; and wherein, when the first and second ports are able to communicate using the respective second and third Internet Protocol addresses, the forwarding engines in the stack units comprising the first and second ports exchange packets of data over the network using the second and third Internet Protocol addresses. Wherein the first port encapsulates one of the packets of data in a second packet and transmits the second packet to the network, wherein the source address of the second packet is the second Internet Protocol address and the destination address of the second packet is the third Internet Protocol address. Wherein the second port encapsulates one of the packets of data in a second packet and transmits the second packet to the network, wherein the source address of the second packet is the third Internet Protocol address and the destination address of the second packet is the second Internet Protocol address. The network comprises a plurality of interconnected networks. An Ethernet switch comprises the first stack unit.

The details of one or more implementations are set forth in the accompanying drawings and the description below. Other features will be apparent from the description and drawings, and from the claims.

Figure 1:
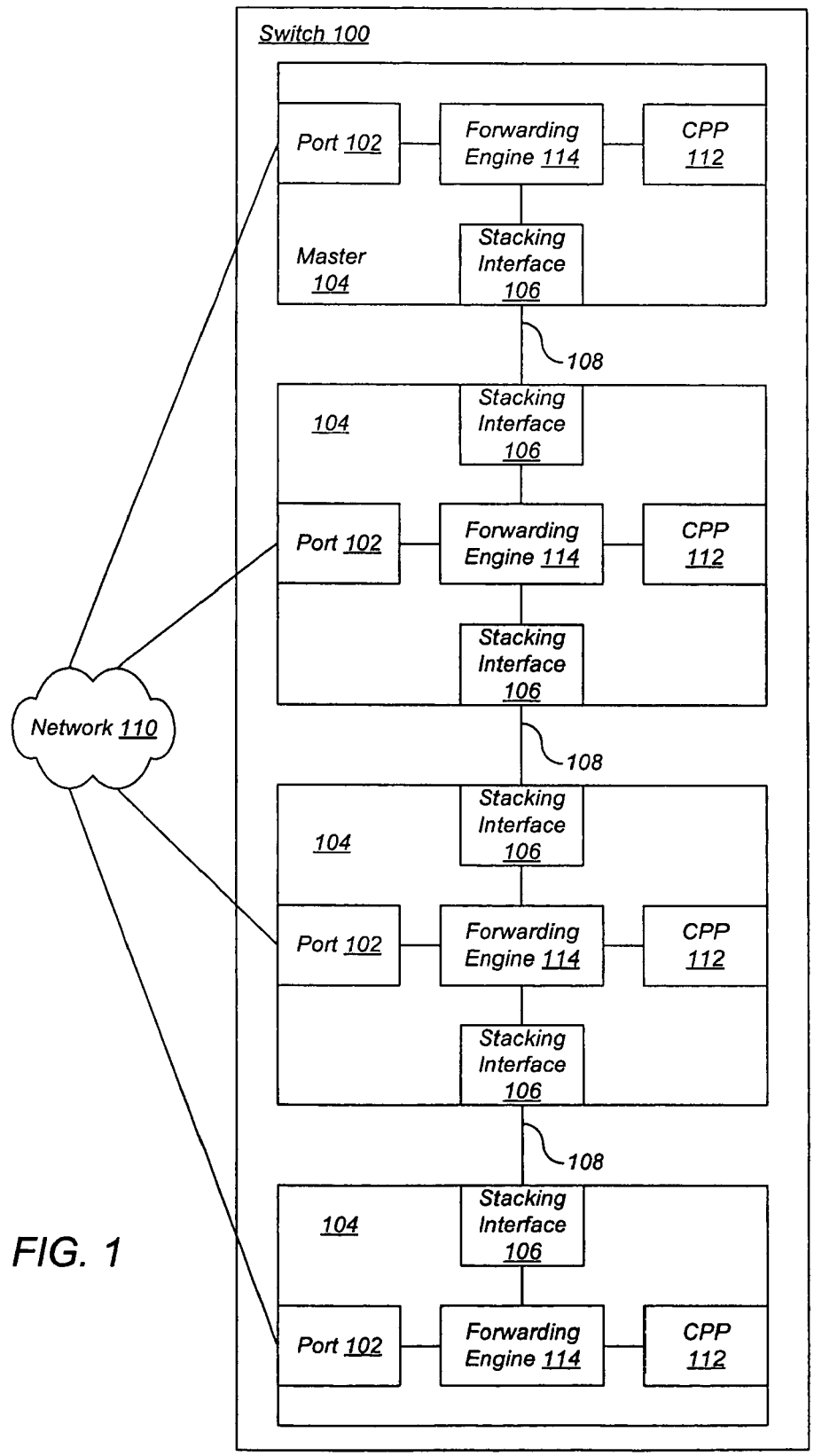
FIG. 1 shows a stackable multi-layer switch connected to a network such as the Internet.

The leading digit(s) of each reference numeral used in this specification indicates the number of the drawing in which the reference numeral first appears.

DETAILED DESCRIPTION

FIG. 1 shows a stackable multi-layer switch 100 connected to a network 110 such as the Internet according to a preferred embodiment. A multi-layer switch is a switch that combines aspects of data link layer switches and network-layer switches, as is well-known in the relevant arts. Of course, stackable network switch 100 can be connected to other networks to function as a router. Network 110 can comprise two or more connected networks. Multi-layer stackable switch 100 comprises a plurality of stack units 104. Like regular network switches, each stack unit 104 comprises ports 102, a forwarding engine 114, and a control plane processor (CPP) 112. But each stack unit 104 also includes one or more stacking interfaces 106 for interconnecting a plurality of the stack units 104 via stacking links 108 to form multi-layer stackable switch 100, in which one of the stack units 104 is configured as the master stack unit. Multi-layer stackable switch 100 then performs as a single large switch, with the control plane processor of the master stack unit acting as the control plane processor for the entire multi-layer stackable switch.

In a multi-layer stacked switch, ports on different stack units can share a single IP address for communicating with a network, as is well-known in the relevant arts. For example, the ports can be configured within the same virtual local area network (VLAN). Embodiments of the present invention implement a failover scheme to address the case where one of the stack units 104 or stacking links 108 fails, thereby forming two sets of stack units 104 that are isolated from each other, yet have the same IP address for communicating with network 110, a network condition that is not permitted. As described in detail below, according to embodiments of the present invention, the two sets of stack units 104 communicate with each other over network 110 using "hidden" IP addresses. In some embodiments, the two sets of stack units 104 communicate to determine which set will continue to function with the original IP address, and which set will shut down. In other embodiments, the sets use the hidden IP addresses and network 110 to exchange the stacking traffic that was formerly exchanged using stacking links 108; because the sets are no longer isolated from each other, they can continue to use the same original IP address to communicate with network 110.

Figure 2:
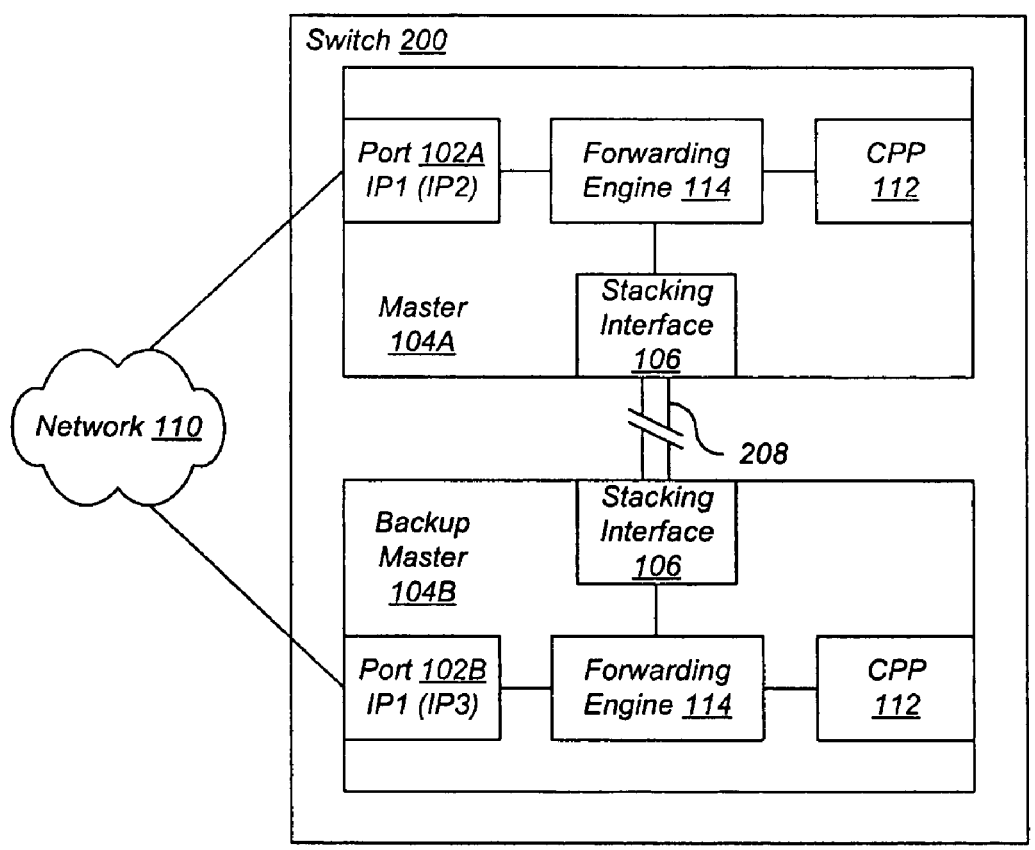
FIG. 2 shows a stackable multi-layer switch comprising a master stack unit and a backup master stack unit according to a preferred embodiment.

FIG. 2 shows a stackable multi-layer switch 200 according to a preferred embodiment. The stack units 104 in stackable multi-layer switch 200 comprise a master stack unit 104A and a backup master stack unit 104B that can operate as a master stack unit 104 when necessary. Each of stack units 104A and 104B comprise ports 102A and 102B, respectively, stacking interfaces 106, forwarding engines 114, and control plane processors (CPP) 112. The stack units 104 in stackable multi-layer switch 100 also generally comprise one or more further stack units 104 (not shown) configured as slave stack units, which operate under the control of the control plane processor of master stack unit 104A and are connected, directly or indirectly, to the stacking interface 106A of master stack unit 104A.

Ports 102A and 102B are configured with a primary IP address IP1 for communicating with network 110 under normal circumstance, as in conventional switches. In addition, according to embodiments of the present invention, each of ports 102A and 102B is configured with a unique "hidden" IP address for use in the event of stacking link failures. Referring again to FIG. 2, port 102A is configured with hidden IP address IP2, and port 102B is configured with hidden IP address IP3.

Master stack unit 104A and backup master stack unit 104B are connected by a stacking path 208 that can be a single stacking link 108, or can comprise one or more slave stack units 104 interconnected by stacking links 108. The traffic exchanged by stack units 104 over their stacking links 108 comprises control traffic between control plane processors 112, control and data traffic between control plane processors 112 and forwarding engines 114, and data traffic between forwarding engines 114, as is well-known in the relevant arts.

Figure 3:
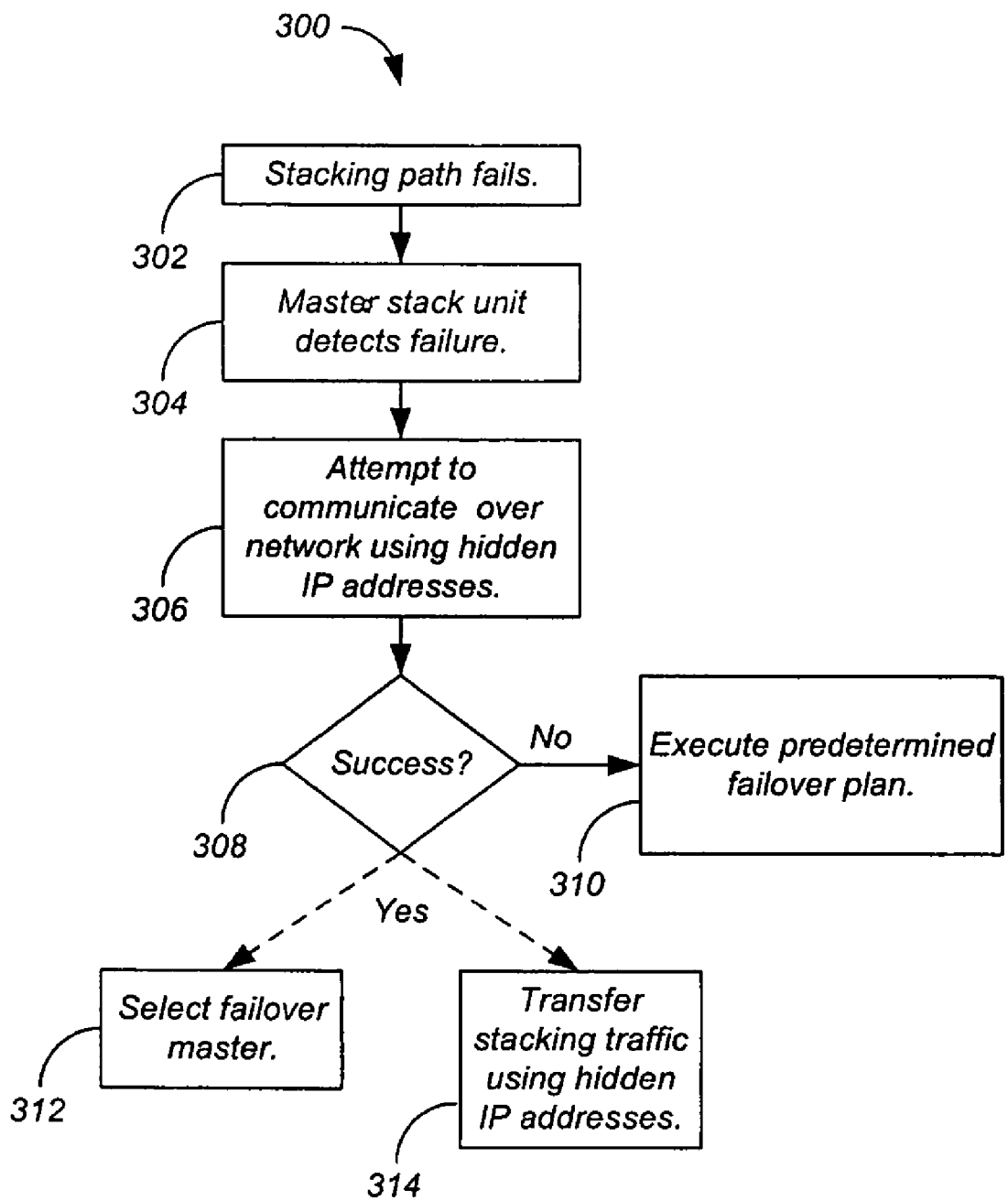
FIG. 3 shows a process that the stackable multi-layer switch of FIG. 2 can implement according to a preferred embodiment.

FIG. 3 shows a process 300 that stackable multi-layer switch 200 can implement according to a preferred embodiment. Master stack unit 104A routinely detects the topology of stackable multi-layer switch 200 according to conventional methods. For purposes of discussion, assume that stacking path 208 fails due to the failure of a stacking link 108 or a further stack unit 104 in stacking path 208 (step 302). Master stack unit 104A then determines that master stack unit 104A is unable to communicate with backup master stack unit 104B through the stacking interfaces 106 (step 304). Therefore master stack unit 104A attempts to communicate with backup master stack unit 104B over network 110 using hidden IP addresses IP2 and IP3 (step 306). For example, master stack unit 104A transmits a packet from port 102A to network 110, where the source address of the packet is the hidden IP address IP2 of port 102A and the destination address of the packet is the hidden IP address IP3 of port 102B. Master stack unit 104A also causes port 102A, and any other port 102 in master stack unit 104A that is using IP address IP1, to cease communicating with network 110 using IP address IP1, including ceasing the distribution of routing information for IP address IP1. If any slave stack units 104 in communication with master stack unit 104A have ports 102 using IP address IP1, master stack unit 104A causes those ports 102 to cease communicating with network 110 using IP address IP1, including ceasing the distribution of routing information for IP address IP1.

In some embodiments, backup master 104B acts in a similar fashion, detecting the failure of stacking path 208 and attempting to communicate with master stack unit 104A over network 110 using hidden IP addresses IP2 and IP3. For example, backup master stack unit 104B transmits a packet from port 102B to network 110, where the source address of the packet is the hidden IP address IP3 of port 102B and the destination address of the packet is the hidden IP address IP2 of port 102A. Backup master stack unit 104B also causes port 102B, and any other port 102 in backup master stack unit 104B that is using IP address IP1, to cease communicating with network 110 using IP address IP1, including, if applicable, ceasing the distribution of routing information for IP address IP1. If any slave stack units 104 in communication with backup master stack unit 104B have ports 102 using IP address IP1, backup master stack unit 104B causes those ports 102 to cease communicating with network 110 using IP address IP1, including, if applicable, ceasing the distribution of routing information for IP address IP1.

Returning to process 300 of FIG. 3, if master stack unit 104A and backup master stack unit 104B are unable to communicate over network 110 for a predetermined interval (step 308), then master stack unit 104A and backup master stack unit 104B each execute a predetermined failover plan (step 310). For example, backup master stack unit 104B causes port 102B to cease communicating with network 110, while master stack unit 104A causes port 102A to continue communicating with network 110 using the original IP address IP1. If any slave stack units 104 in communication with master stack unit 104A have ports 102 using IP address IP1, master stack unit 104A causes those ports 102 to continue communicating with network 110 using IP address IP1. Similarly, If any slave stack units 104 in communication with backup master stack unit 104B have ports 102 using IP address IP1, backup master stack unit 104B causes those ports 102 to cease communicating with network 110 using IP address IP1.

However, if master stack unit 104A and backup master stack unit 104B are able to communicate over network 110 (step 308), then in some embodiments master stack unit 104A and backup master stack unit 104B negotiate to determine which of the two should continue network communications using IP address IP1, and which should cease those communications (step 312). In particular, one of master stack unit 104A and backup master stack unit 104B is selected as a failover master stack unit according to predetermined criteria. The predetermined criteria can include, for example, the number of slave stack units 104 in communication with each of master stack unit 104A and backup master stack unit 104B, the number of ports using IP address IP1 that are controlled by master stack unit 104A and backup master stack unit 104B, the relative uptimes of master stack unit 104A and backup master stack unit 104B, and the like. The failover master stack unit 104 continues to use IP address IP1 to communicate with network 110, while the other stack unit 104 ceases to use IP address IP1 to communicate with network 110.

In some embodiments, the stack unit 104 not chosen as the failover master monitors liveliness packets sent by the failover master, and assumes the role of failover master when no liveliness packet is received in a predetermined interval.

Of course at some point when stacking path 208 is repaired, it is desirable that multi-layer stackable switch 200 resume its normal operational configuration where master stack unit 104A and backup master stack unit 104B exchange stacking traffic over stacking path 208. To automate this process, one or both of stack units 104 monitors its stacking interface 106 to detect the repair.

In other embodiments, when master stack unit 104A and backup master stack unit 104B are able to communicate over network 110 (step 308), they use the hidden IP addresses and the network 110 to exchange the stacking traffic that was formerly exchanged communication using stacking path 208 (step 314). Because master stack unit 104A and backup master stack unit 104B are no longer isolated from each other, they can continue to use the same original IP address IP1 to communicate with network 110. For example, to send a packet to backup master stack unit 104B, master stack unit 104A encapsulates the packet iii a second packet having address IP2 as the source address and address IP3 as the destination address, and transmits the second packet to network 110. Similarly, to send a packet to master stack unit 104A, backup master stack unit 104B encapsulates the packet in a second packet having address IP3 as the source address and address IP2 as the destination address, and transmits the second packet to network 110.

In the above description, each of master stack unit 104A and backup master stack unit 104B comprise a port 102 using a common IP address IP1 to communicate with network 110. However, embodiments of the invention are not limited to this case. For example, one or both of master stack unit 104A and backup master stack unit 104B may not comprise a port 102 using a common IP address IP1 to communicate with network 110. One or both of master stack unit 104A and backup master stack unit 104B may instead be in communication with a slave stack unit 104 that comprises a port 102 using a common IP address IP1 to communicate with network 110.

Figure 4:
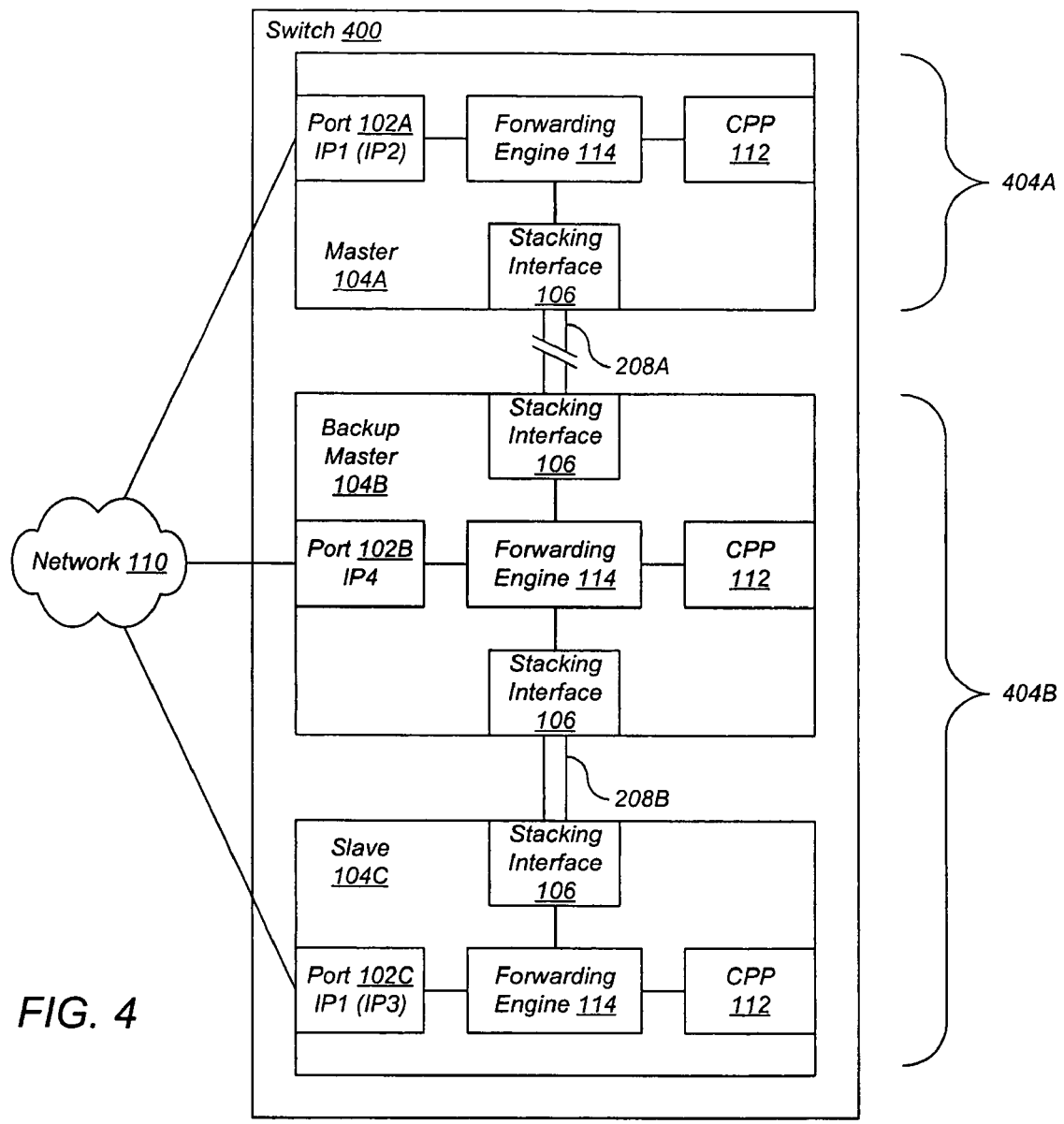
FIG. 4 shows a stackable multi-layer switch separated into two sets of stack units by a failure in a stacking path connecting the sets where one set comprises a master stack unit and the other set comprises a backup master stack unit and a slave stack unit.

For example, referring to FIG. 4, a failure in a stacking path 208A has separated a stackable multi-layer switch 400 into two sets 404 of stack units 104. Set 404A comprises master stack unit 104A. Set 404B comprises backup master stack unit 104B and a slave stack unit 104C connected by a stacking path 208B that can be a single stacking link 108, or can comprise one or more slave stack units 104 interconnected by stacking links 108. Ports 102A and 102C are configured with a primary IP address IP1 for communicating with network 110 under normal circumstance and respective unique hidden IP addresses IP2 and IP3 for use in the event of stacking link failures. IP address IP1 is shared by port 102A in master stack unit 104A and port 102C in slave stack unit 104C, but is not shared by any ports in backup master stack unit 104B. For example, port 102B in backup master stack unit 104B communicates with network 110 using IP address IP4. In such a case, master stack unit 102A operates as described above. But instead of attempting to communicate with master stack unit 104A using an internal port such as port 102B, backup master stack unit 104B uses port 102C in slave stack unit 104C in a similar manner.

Figure 5:
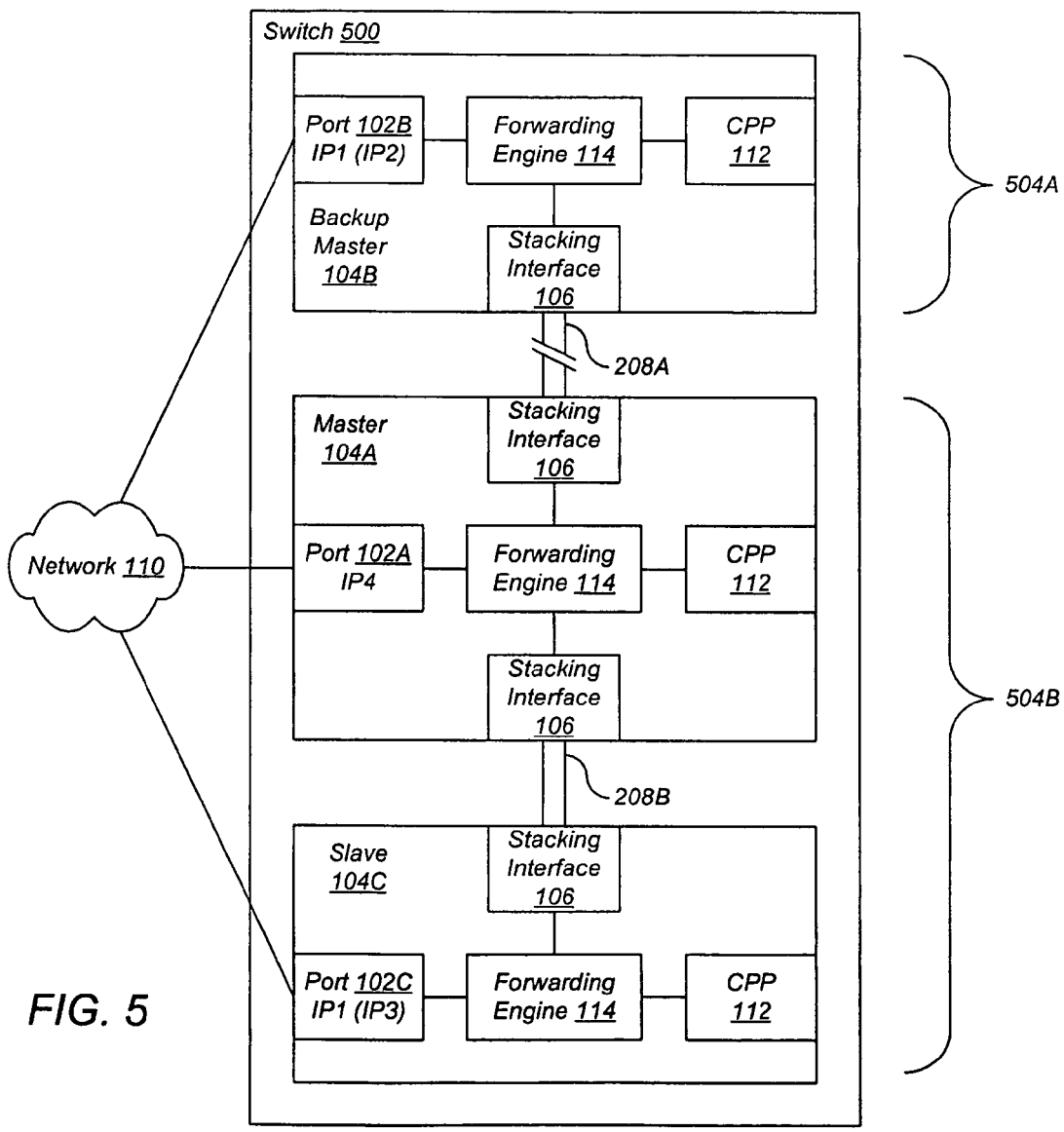
FIG. 5 shows a stackable multi-layer switch separated into two sets of stack units by a failure in a stacking path connecting the sets where one set comprises a backup master stack unit and the other set comprises a master stack unit and a slave stack unit.

As another example, referring to FIG. 5, a failure in a stacking path 208A has separated a stackable multi-layer switch 500 into two sets 504 of stack units 104. Set 504A comprises backup master stack unit 104B. Set 504B comprises master stack unit 104A and a slave stack unit 104C connected by a stacking path 208B that can be a single stacking link 108, or can comprise one or more slave stack units 104 interconnected by stacking links 108. Ports 102B and 102C are configured with a primary IP address IP1 for communicating with network 110 under normal circumstance and respective unique hidden IP addresses IP2 and IP3 for use in the event of stacking link failures. IP address IP1 is shared by port 102B in backup master stack unit 104B and port 102C in slave stack unit 104C, but is not shared by any ports in master stack unit 104A. For example, port 102A in master stack unit 104A communicates with network 110 using IP address IP4. In such a case, backup master stack unit 104B operates as described above. But instead of attempting to communicate with backup master stack unit 104B over network 110 using an internal port such as port 102A, master stack unit 104A uses port 102C in slave stack unit 104C in a similar manner.

Figure 6:
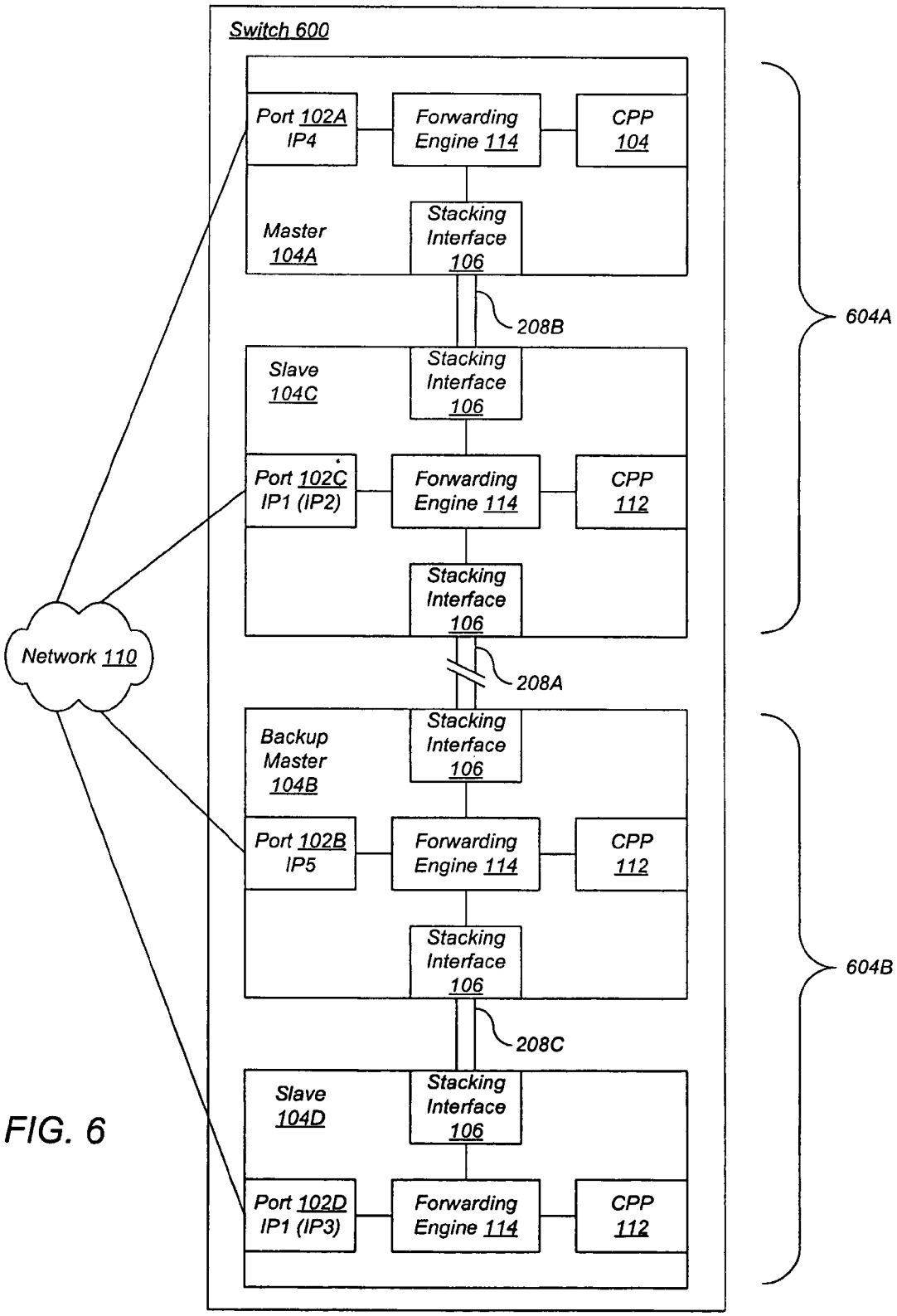
FIG. 6 shows a stackable multi-layer switch separated into two sets of stack units by a failure in a stacking path connecting the sets where one set comprises a backup master stack unit and a slave stack unit and the other set comprises a master stack unit and a slave stack unit.

As another example, referring to FIG. 6, a failure in a stacking path 208A has separated a stackable multi-layer switch 600 into two sets 604 of stack units 104. Set 604A comprises master stack unit 104A and a slave stack unit 104C connected by a stacking path 208B that can be a single stacking link 108, or can comprise one or more slave stack units 104 interconnected by stacking links 108. Set 604B comprises backup master stack unit 104B and a slave stack unit 104D connected by a stacking path 208C that can be a single stacking link 108, or can comprise one or more slave stack units 104 interconnected by stacking links 108. Ports 102C and 102D are configured with a primary IP address IP1 for communicating with network 110 under normal circumstance and respective unique hidden IP addresses IP2 and IP3 for use in the event of stacking link failures. IP address IP1 is shared by port 102C in slave stack unit 104C and port 102D in slave stack unit 104D, but is not shared by any ports in master stack unit 104A or backup master stack unit 104B. For example, port 102A in master stack unit 104A communicates with network 110 using IP address IP4, and port 102B in backup master stack unit 104B communicates with network 110 using IP address IP5. In such a case, instead of attempting communications over network 110 through internal ports 102A and 102B, master stack unit 104A and backup master stack unit 104B communicate through port 102C in slave stack unit 104C and port 102D in slave stack unit 104D over network 110 using hidden IP addresses IP2 and IP3, as described above.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A stackable multi-layer switch comprising:
   a first set of stack units comprising a master stack unit, wherein one of the stack units in the first set comprises a first port to communicate with a network using a first Internet Protocol address; and
   a second set of the stack units comprising a backup master stack unit, wherein one of the stack units in the second set comprises a second port to communicate with the network using the first Internet Protocol address;
   wherein each of the stack units comprises
      a control plane processor,
      one or more ports,
      a stacking interface, and
      a forwarding engine to communicate with the control plane processor, the ports, and the stacking interface;
   wherein the stack units communicate with each other through the stacking interfaces; and
   wherein, when the master stack unit is unable to communicate with the backup master stack unit through the stacking interfaces, the first and second ports attempt to communicate with each other over the network using a second Internet Protocol address associated with the first port and a third Internet Protocol address associated with the second port.

2. The stackable multi-layer switch of claim 1:
   wherein, to attempt to communicate, the first port transmits a packet to the network, wherein the source address of the packet is the second Internet Protocol address and destination address of the packet is the third Internet Protocol address.

3. The stackable multi-layer switch of claim 1:
   wherein, to attempt to communicate, the second port transmits a packet to the network, wherein the source address of the packet is the third Internet Protocol address and destination address of the packet is the second Internet Protocol address.

4. The stackable multi-layer switch of claim 1:
wherein, when the first and second ports are able to communicate using the respective second and third Internet Protocol addresses, at least one of the master stack unit and the backup master stack unit selects one of the first and second sets of stack units according to predetermined criteria;
wherein the one of the first and second ports in the selected set of stack units continues to communicate with the network using the first Internet Protocol address; and
wherein the one of the first and second ports in the set of stack units not selected ceases to communicate with the network.

5. The stackable multi-layer switch of claim 4, wherein the predetermined criteria comprises at least one of the group consisting of:
the number of stack units in the first set of stack units;
the number of stack units in the second set of stack units;
the relative uptimes of the master stack unit and the backup master stack unit;
the number of ports in the first set that communicate with the network using the first Internet Protocol address; and
the number of ports in the second set that communicate with the network using the first Internet Protocol address.

6. The stackable multi-layer switch of claim 1:
wherein, when the first and second ports are able to communicate using the respective second and third Internet Protocol addresses, the forwarding engines in the stack units comprising the first and second ports exchange packets of data over the network using the second and third Internet Protocol addresses.

7. The stackable multi-layer switch of claim 1:
wherein the first port encapsulates one of the packets of data in a second packet and transmits the second packet to the network, wherein the source address of the second packet is the second Internet Protocol address and the destination address of the second packet is the third Internet Protocol address.

8. The stackable multi-layer switch of claim 1:
wherein the second port encapsulates one of the packets of data in a second packet and transmits the second packet to the network, wherein the source address of the second packet is the third Internet Protocol address and the destination address of the second packet is the second Internet Protocol address.

9. The stackable multi-layer switch of claim 1:
wherein the network comprises a plurality of interconnected networks.

10. An Ethernet switch comprising the stackable multi-layer switch of claim 1.

11. A stackable multi-layer switch comprising:
a first set of stack unit means comprising a master stack unit means, wherein one of the stack unit means in the first set comprises first port means for communicating with a network using a first Internet Protocol address; and
a second set of the stack unit means comprising a backup master stack unit means, wherein one of the stack unit means in the second set comprises second port means for communicating with the network using the first Internet Protocol address;
wherein each of the stack unit means comprises
control plane processing means,
one or more port means,
stacking interface means, and
forwarding engine means for communicating with the control plane processing means, the port means, and the stacking interface means;
wherein the stack unit means communicate with each other through the stacking interface means; and
wherein, when the master stack unit means is unable to communicate with the backup master stack unit means through the stacking interface means, the first and second port means attempt to communicate with each other over the network using a second Internet Protocol address associated with the first port means and a third Internet Protocol address associated with the second port means.

12. The stackable multi-layer switch of claim 11:
wherein, to attempt to communicate, the first port means transmits a packet to the network, wherein the source address of the packet is the second Internet Protocol address and destination address of the packet is the third Internet Protocol address.

13. The stackable multi-layer switch of claim 11:
wherein, to attempt to communicate, the second port means transmits a packet to the network, wherein the source address of the packet is the third Internet Protocol address and destination address of the packet is the second Internet Protocol address.

14. The stackable multi-layer switch of claim 11:
wherein, when the first and second port means are able to communicate using the respective second and third Internet Protocol addresses, at least one of the master stack unit means and the backup master stack unit means selects one of the first and second sets of stack unit means according to predetermined criteria;
wherein the one of the first and second port means in the selected set of stack unit means continues to communicate with the network using the first Internet Protocol address; and
wherein the one of the first and second port means in the set of stack unit means not selected ceases to communicate with the network.

15. The stackable multi-layer switch of claim 14, wherein the predetermined criteria comprises at least one of the group consisting of:
the number of stack unit means in the first set of stack unit means;
the number of stack unit means in the second set of stack unit means;
the relative uptimes of the master stack unit means and the backup master stack unit means;
the number of port means in the first set that communicate with the network using the first Internet Protocol address; and
the number of port means in the second set that communicate with the network using the first Internet Protocol address.

16. The stackable multi-layer switch of claim 11:
wherein, when the first and second port means are able to communicate using the respective second and third Internet Protocol addresses, the forwarding engine means in the stack unit means comprising the first and second port means exchange packets of data over the network using the second and third Internet Protocol addresses.

17. The stackable multi-layer switch of claim 11:
wherein the first port means encapsulates one of the packets of data in a second packet and transmits the second packet to the network, wherein the source address of the second packet is the second Internet Protocol address and the destination address of the second packet is the third Internet Protocol address.

18. The stackable multi-layer switch of claim 11:
wherein the second port means encapsulates one of the packets of data in a second packet and transmits the second packet to the network, wherein the source address of the second packet is the third Internet Protocol address and the destination address of the second packet is the second Internet Protocol address.

19. The stackable multi-layer switch of claim 11:
wherein the network comprises a plurality of interconnected networks.

20. An Ethernet switch comprising the stackable multi-layer switch of claim 11.

21. A method for a stackable multi-layer switch comprising a first set of stack units comprising a master stack unit, wherein one of the stack units in the first set comprises a first port to communicate with a network using a first Internet Protocol address, and a second set of the stack units comprising a backup master stack unit, wherein one of the stack units in the second set comprises a second port to communicate with the network using the first Internet Protocol address, and wherein each of the stack units comprises a stacking interface to communicate with others of the stack units, the method comprising:
determining whether the master stack unit is able to communicate with the backup master stack unit through the stacking interfaces; and
when the master stack unit is unable to communicate with the backup master stack unit through the stacking interfaces, attempting to communicate between the first and second ports over the network using a second Internet Protocol address associated with the first port and a third Internet Protocol address associated with the second port.

22. The method of claim 21, wherein attempting to communicate between the first and second ports over the network using a second Internet Protocol address associated with the first port and a third Internet Protocol address associated with the second port comprises:
transmitting a packet from the first port to the network, wherein the source address of the packet is the second Internet Protocol address and destination address of the packet is the third Internet Protocol address.

23. The method of claim 21, wherein attempting to communicate between the first and second ports over the network using a second Internet Protocol address associated with the first port and a third Internet Protocol address associated with the second port comprises:
transmitting a packet from the second port to the network, wherein the source address of the packet is the third Internet Protocol address and destination address of the packet is the second Internet Protocol address.

24. The method of claim 21, wherein the first and second ports are able to communicate using the respective second and third Internet Protocol addresses, further comprising:
selecting one of the first and second sets of stack units according to predetermined criteria;
wherein the one of the first and second ports in the selected set of stack units continues to communicate with the network using the first Internet Protocol address; and
wherein the one of the first and second pops in the set of stack units not selected ceases to communicate with the network.

25. The method of claim 24, wherein the predetermined criteria comprises at least one of the group consisting of:
the number of stack units in the first set of stack units;
the number of stack units in the second set of stack units;
the relative uptimes of the master stack unit and the backup master stack unit;
the number of ports in the first set that communicate with the network using the first Internet Protocol address; and
the number of ports in the second set that communicate with the network using the first Internet Protocol address.

26. The method of claim 21, wherein the first and second ports are able to communicate using the respective second and third Internet Protocol addresses, further comprising at least one of the group consisting of:
sending packets of data from the first port to the second port over the network using the second and third Internet Protocol addresses; and
sending packets of data from the second port to the first port over the network using the second and third Internet Protocol addresses.

27. The method of claim 26, wherein sending packets of data from the first port to the second port over the network using the second and third Internet Protocol addresses comprises:
encapsulating one of the packets of data in a second packet; and
transmitting the second packet from the first port to the network, wherein the source address of the second packet is the second Internet Protocol address and the destination address of the second packet is the third Internet Protocol address.

28. The method of claim 26, wherein sending packets of data from the second port to the first port over the network using the second and third Internet Protocol addresses comprises:
encapsulating one of the packets of data in a second packet; and
transmitting the second packet from the second port to the network, wherein the source address of the second packet is the third Internet Protocol address and the destination address of the second packet is the first Internet Protocol address.

29. The method of claim 21:
wherein the network comprises a plurality of interconnected networks.

30. A computer readable medium having a stored computer program embodying instructions, which, when executed by a computer, cause the computer to operate a stackable multi-layer switch comprising a first set of stack units and a second set of stack units, the first set of stack units comprising a master stack unit, wherein one of the stack units in the first set of stack units comprises a first port to communicate with a network using a first Internet Protocol address, and the second set of stack units comprising a backup master stack unit, wherein one of the stack units in the second set of stack units comprises a second port to communicate with the network using the first Internet Protocol address, and wherein each of the stack units comprises a stacking interface to communicate with others of the stack units, the computer readable medium comprising:
instructions for determining whether the master stack unit is able to communicate with the backup master stack unit through the stacking interfaces; and
instructions for, when the master stack unit is unable to communicate with the backup master stack unit through the stacking interfaces, attempting to communicate between the first and second ports over the network using a second Internet Protocol address associated with the first port and a third Internet Protocol address associated with the second port.

31. The computer readable medium of claim 30, wherein the instructions for attempting to communicate between the first and second ports over the network comprises:
   instructions for causing the first port to transmit a packet to the network, wherein the source address of the packet is the second Internet Protocol address and destination address of the packet is the third Internet Protocol address.

32. The computer readable medium of claim 30, wherein the instructions for attempting to communicate between the first and second ports over the network comprises:
   instructions for causing the second port to transmit a packet to the network, wherein the source address of the packet is the third Internet Protocol address and destination address of the packet is the second Internet Protocol address.

33. The computer readable medium of claim 30, wherein the first and second ports are able to communicate using the respective second and third Internet Protocol addresses, further comprising:
   instructions for selecting one of the first and second sets of stack units according to predetermined criteria; and
   instructions for wherein the one of the first and second ports in the selected set of stack units continues to communicate with the network using the first Internet Protocol address,
   wherein the one of the first and second ports in the set of stack units not selected ceases to communicate with the network.

34. The computer readable medium of claim 33, wherein the predetermined criteria comprises at least one of the group consisting of:
   the number of stack units in the first set of stack units;
   the number of stack units in the second set of stack units;
   the relative uptimes of the master stack unit and the backup master stack unit;
   the number of ports in the first set of stack units that communicate with the network using the first Internet Protocol address; and
   the number of ports in the second set of stack units that communicate with the network using the first Internet Protocol address.

35. The computer readable medium of claim 30, wherein the first and second ports are able to communicate using the respective second and third Internet Protocol addresses, further comprising at least one of the group consisting of:
   instructions for causing the first port to send packets of data to the second port over the network using the second and third Internet Protocol addresses; and
   instructions for causing the second port to send packets of data to the first port over the network using the second and third Internet Protocol addresses.

36. The computer readable medium of claim 35, wherein the instructions for causing the first port to send packets of data to the second port over the network comprises:
   instructions for encapsulating one of the packets of data in a second packet; and
   instructions for causing the first port to transmit the second packet to the network, wherein the source address of the second packet is the second Internet Protocol address and the destination address of the second packet is the third Internet Protocol address.

37. The computer readable medium of claim 35, wherein the instructions for causing the second port to send packets of data to the first port over the network comprises:
   instructions for encapsulating one of the packets of data in a second packet; and
   instructions for causing the second port to transmit the second packet to the network, wherein the source address of the second packet is the third Internet Protocol address and the destination address of the second packet is the first Internet Protocol address.

38. The computer readable medium of claim 30:
   wherein the network comprises a plurality of interconnected networks.

39. A first stack unit for a stackable multi-layer switch comprising a first set of the stack units including the first stack unit, wherein one of the stack units in the first set comprises a first port to communicate with a network using a first Internet Protocol address, and a second set of the stack units including a second stack unit, wherein one of the stack units in the second set comprises a second port to communicate with the network using the first Internet Protocol address, the first stack unit comprising:
   a control plane processor;
   one or more ports;
   a stacking interface; and
   a forwarding engine to exchange packets of data with the control plane processor, the master ports, and the stacking interface;
   wherein the stack units communicate with each other through the stacking interfaces; and
   wherein, when the first stack unit is unable to communicate with the second stack unit through the stacking interfaces, the first stack unit causes the first port to attempt to communicate with the second port over the network using a second Internet Protocol address associated with the first port and a third Internet Protocol address associated with the second port.

40. The first stack unit of claim 39:
   wherein, to attempt to communicate, the first port transmits a packet to the network, wherein the source address of the packet is the second Internet Protocol address and destination address of the packet is the third Internet Protocol address.

41. The first stack unit of claim 39:
   wherein, when the first and second ports are able to communicate using the respective second and third Internet Protocol addresses, at least one of the first and second stack units selects one of the first and second sets of stack units according to predetermined criteria;
   wherein the one of the first and second ports in the selected set of stack units continues to communicate with the network using the first Internet Protocol address; and
   wherein the one of the first and second ports in the set of stack units not selected ceases to communicate with the network.

42. The first stack unit of claim 41, wherein the predetermined criteria comprises at least one of the group consisting of:
   the number of stack units in the first set of stack units;
   the number of stack units in the second set of stack units;
   the relative uptimes of the first and second stack units;
   the number of ports in the first set that communicate with the network using the first Internet Protocol address; and
   the number of ports in the second set that communicate with the network using the first Internet Protocol address.

43. The first stack unit of claim 39:
   wherein each of the stack units comprises a forwarding engine; and wherein, when the first and second ports are able to communicate using the respective second and third Internet Protocol addresses, the forwarding engines in the stack units comprising the first and second ports exchange packets of data over the network using the second and third Internet Protocol addresses.

44. The first stack unit of claim 43:
wherein the first port encapsulates one of the packets of data in a second packet and transmits the second packet to the network, wherein the source address of the second packet is the second Internet Protocol address and the destination address of the second packet is the third Internet Protocol address.

45. The first stack unit of claim 43:
wherein the second port encapsulates one of the packets of data in a second packet and transmits the second packet to the network, wherein the source address of the second packet is the third Internet Protocol address and the destination address of the second packet is the second Internet Protocol address.

46. The first stack unit of claim 39:
wherein the network comprises a plurality of interconnected networks.

47. An Ethernet switch comprising the first stack unit of claim 39.

48. A first stack unit for a stackable multi-layer switch comprising a first set of the stack units including the first stack unit, wherein one of the stack units in the first set comprises a first port to communicate with a network using a first Internet Protocol address, and a second set of the stack units including a second stack unit, wherein one of the stack units in the second set comprises a second port to communicate with the network using the first Internet Protocol address, the first stack unit comprising:
control plane processing means;
one or more port means;
a stacking interface; and
forwarding engine means for exchanging packets of data with the control plane processing means, the master port means, and the stacking interface means;
wherein the stack units communicate with each other through the stacking interface means; and
wherein, when the first stack unit is unable to communicate with the second stack unit through the stacking interface means, the first stack unit causes the first port to attempt to communicate with the second port over the network using a second Internet Protocol address associated with the first port and a third Internet Protocol address associated with the second port.

49. The first stack unit of claim 48:
wherein, to attempt to communicate, the first port transmits a packet to the network, wherein the source address of the packet is the second Internet Protocol address and destination address of the packet is the third Internet Protocol address.

50. The first stack unit of claim 48:
wherein, when the first and second ports are able to communicate using the respective second and third Internet Protocol addresses, at least one of the first and second stack units selects one of the first and second sets of stack units according to predetermined criteria;
wherein the one of the first and second ports in the selected set of stack units continues to communicate with the network using the first Internet Protocol address; and
wherein the one of the first and second ports in the set of stack units not selected ceases to communicate with the network.

51. The first stack unit of claim 50, wherein the predetermined criteria comprises at least one of the group consisting of:
the number of stack units in the first set of stack units;
the number of stack units in the second set of stack units;
the relative uptimes of the first and second stack units;
the number of port means in the first set that communicate with the network using the first Internet Protocol address; and
the number of port means in the second set that communicate with the network using the first Internet Protocol address.

52. The first stack unit of claim 48:
wherein each of the stack units comprises forwarding engine means; and
wherein, when the first and second ports are able to communicate using the respective second and third Internet Protocol addresses, the forwarding engine means in the stack units comprising the first and second ports exchange packets of data over the network using the second and third Internet Protocol addresses.

53. The first stack unit of claim 52:
wherein the first port encapsulates one of the packets of data in a second packet and transmits the second packet to the network, wherein the source address of the second packet is the second Internet Protocol address and the destination address of the second packet is the third Internet Protocol address.

54. The first stack unit of claim 52:
wherein the second port encapsulates one of the packets of data in a second packet and transmits the second packet to the network, wherein the source address of the second packet is the third Internet Protocol address and the destination address of the second packet is the second Internet Protocol address.

55. The first stack unit of claim 48:
wherein the network comprises a plurality of interconnected networks.

56. An Ethernet switch comprising the first stack unit of claim 48.

57. A method for a first stack unit in a stackable multi-layer switch comprising the first stack unit and a second stack unit, wherein the first and second stack units are connected by a stacking path, wherein the first stack unit comprises a first port that communicates with a network using a first Internet Protocol address, and wherein the second stack unit comprises a second port that communicates with the network using the first Internet Protocol address, the method comprising:
determining whether it is possible to communicate with the second stack unit over the stacking path; and
when it is not possible to communicate with the second stack unit over the stacking path, attempting to communicate between the first port and the second port over the network using a second Internet Protocol address associated with the first port and a third Internet Protocol address associated with the second port.

58. The method of claim 57, wherein causing the first port to attempt to communicate with the second port over the network using a second Internet Protocol address associated with the first port and a third Internet Protocol address associated with the second port comprises:
causing the first port to transmit a packet to the network, wherein the source address of the packet is the second Internet Protocol address and destination address of the packet is the third Internet Protocol address.

59. The method of claim 57, wherein the first and second ports are able to communicate using the respective second and third Internet Protocol addresses, further comprising:
selecting one of the first and second sets of stack units according to predetermined criteria;
wherein the one of the first and second ports in the selected set of stack units continues to communicate with the network using the first Internet Protocol address; and
wherein the one of the first and second ports in the set of stack units not selected ceases to communicate with the network.

60. The method of claim 59, wherein the predetermined criteria comprises at least one of the group consisting of:
the number of further stack units the first stack unit can communicate with over the stacking interfaces; and
the number of the further stack units the second stack unit can communicate with over the stacking interfaces;
the relative uptimes of the first and second stack units;
the number of ports the first stack unit can communicate with over the stacking interfaces that communicate with the network using the first Internet Protocol address; and
the number of ports the second stack unit can communicate with over the stacking interfaces that communicate with the network using the first Internet Protocol address.

61. The method of claim 57, wherein the first and second ports are able to communicate using the respective second and third Internet Protocol addresses, further comprising:
causing the first and second ports to exchange packets of data over the network using the second and third Internet Protocol addresses.

62. The method of claim 61, further comprising:
causing the first port to encapsulate one of the packets of data in a second packet and transmit the second packet to the network, wherein the source address of the second packet is the second Internet Protocol address and the destination address of the second packet is the third Internet Protocol address.

63. The method of claim 57:
wherein the network comprises a plurality of interconnected networks.

64. A computer readable medium having a stored computer program embodying instructions, which, when executed by a computer, cause the computer to operate a stackable multi-layer switch comprising a first stack unit and a second stack unit, wherein the first and second stack units are connected by a stacking path, wherein the first stack unit comprises a first port that communicates with a network using a first Internet Protocol address, and wherein the second stack unit comprises a second port that communicates with the network using the first Internet Protocol address, the computer readable medium comprising:
instructions for determining whether it is possible to communicate with the second stack unit over the stacking path; and
instructions for, when it is not possible to communicate with the second stack unit over the stacking path, attempting to communicate between the first port and the second port over the network using a second Internet Protocol address associated with the first port and a third Internet Protocol address associated with the second port.

65. The computer readable medium of claim 64, wherein the instructions for attempting to communicate with the second port over the network comprises:
instructions for causing the first port to transmit a packet to the network, wherein the source address of the packet is the second Internet Protocol address and destination address of the packet is the third Internet Protocol address.

66. The computer readable medium of claim 64, wherein the first and second ports are able to communicate using the respective second and third Internet Protocol addresses, further comprising:
instructions for selecting one of the first and second sets of stack units according to predetermined criteria,
wherein the one of the first and second ports in the selected set of stack units continues to communicate with the network using the first Internet Protocol address, and
wherein the one of the first and second ports in the set of stack units not selected ceases to communicate with the network.

67. The computer readable medium of claim 66, wherein the predetermined criteria comprises at least one of the group consisting of:
the number of further stack units the first stack unit can communicate with over the stacking interfaces;
the number of the further stack units the second stack unit can communicate with over the stacking interfaces;
the relative uptimes of the first and second stack units;
the number of ports the first stack unit can communicate with over the stacking interfaces that communicate with the network using the first Internet Protocol address; and
the number of ports the second stack unit can communicate with over the stacking interfaces that communicate with the network using the first Internet Protocol address.

68. The computer readable medium of claim 64, wherein the first and second ports are able to communicate using the respective second and third Internet Protocol addresses, further comprising:
instructions for causing the first and second ports to exchange packets of data over the network using the second and third Internet Protocol addresses.

69. The computer readable medium of claim 68, further comprising:
instructions for causing the first port to encapsulate one of the packets of data in a second packet and transmit the second packet to the network, wherein the source address of the second packet is the second Internet Protocol address and the destination address of the second packet is the third Internet Protocol address.

70. The computer readable medium of claim 64:
wherein the network comprises a plurality of interconnected networks.

* * * * *